(12) United States Patent
Sharma et al.

(10) Patent No.: US 7,886,086 B2
(45) Date of Patent: Feb. 8, 2011

(54) METHOD AND APPARATUS FOR RESTRICTING INPUT/OUTPUT DEVICE PEER-TO-PEER OPERATIONS IN A DATA PROCESSING SYSTEM TO IMPROVE RELIABILITY, AVAILABILITY, AND SERVICEABILITY

(75) Inventors: Maneesh Sharma, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 11/050,352

(22) Filed: Feb. 3, 2005

(65) Prior Publication Data

US 2006/0179195 A1 Aug. 10, 2006

(51) Int. Cl.
*G06F 3/00* (2006.01)
*G06F 13/36* (2006.01)

(52) U.S. Cl. ......................................... 710/29; 710/314
(58) Field of Classification Search ................... 710/29, 710/314
See application file for complete search history.

(56) References Cited

U.S. PATENT DOCUMENTS

| | | | | |
|---|---|---|---|---|
| 5,796,977 A | * | 8/1998 | Sarangdhar et al. ............ 718/1 |
| 5,867,728 A | * | 2/1999 | Melo et al. ...................... 710/8 |
| 6,029,222 A | * | 2/2000 | Kamiya ....................... 710/262 |
| 6,061,794 A | * | 5/2000 | Angelo et al. ................... 726/3 |
| 6,223,230 B1 | * | 4/2001 | Garnett et al. ................. 710/26 |
| 6,738,818 B1 | * | 5/2004 | Shah ........................... 709/228 |
| 6,742,071 B1 | * | 5/2004 | Boynton et al. ............. 710/305 |
| 6,754,817 B2 | * | 6/2004 | Khatri et al. ..................... 713/1 |
| 7,046,668 B2 | * | 5/2006 | Pettey et al. .................. 370/392 |
| 7,188,254 B2 | * | 3/2007 | Somin et al. ................. 713/185 |
| 2003/0172322 A1 | * | 9/2003 | Kitamorn et al. .............. 714/43 |
| 2003/0217311 A1 | * | 11/2003 | Smith ........................... 714/43 |

\* cited by examiner

*Primary Examiner*—Henry W Tsai
*Assistant Examiner*—Juanito C Borromeo
(74) *Attorney, Agent, or Firm*—Yee & Associates, P.C.; Diana R. Gerhardt (57) ABSTRACT

A method and an apparatus are provided for restricting input/output device peer-to-peer operations in a data processing system to improve reliability, availability, and serviceability. A peer-to-peer (P2P) control logic is provided to perform a lookup of P2P lookup table entries. Each P2P lookup table entry comprises bus, device and function number fields, optional control fields, and an accept/reject bit. Upon receiving a communication request from a requesting I/O device, P2P control logic implemented in either a logical bridge or an I/O device identifies the requester ID of the request and determines if a match exists in the P2P lookup table entries. If a match is found and the accept/reject bit is enabled, I/O operations can be received from the requester.

14 Claims, 4 Drawing Sheets

FIG. 1

100 DATA PROCESSING SYSTEM

METHOD AND APPARATUS FOR RESTRICTING INPUT/OUTPUT DEVICE PEER-TO-PEER OPERATIONS IN A DATA PROCESSING SYSTEM TO IMPROVE RELIABILITY, AVAILABILITY, AND SERVICEABILITY

BACKGROUND OF THE INVENTION

1. Technical Field

The present invention relates to a data processing system. In particular, the present invention relates to improving reliability, availability, and serviceability (RAS) of a data processing system. Still more particular, the present invention relates to restricting peer-to-peer (P2P) operations in a data processing system to improve RAS using Requester ID decoding. Still more particular, the present invention relates to restricting peer-to-peer (P2P) operations in a data processing system to improve RAS using Requester ID decoding, wherein the data processing system is logically partitioned (LPARed).

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logically partitioned (LPARed) data processing systems. A logically partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors with their interrupt management area, regions of system memory, and input/output (I/O) device bus slots. The partition's resources are represented by the platform's firmware to the operating system image.

Each distinct operating system or image of an operating system running within a platform is protected from each other such that software errors on one logical partition cannot affect the correct operations of any of the other partitions. This protection is provided by allocating a disjoint set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logically partitioned data processing system, these resources are disjoint among various partitions. These resources may include, for example, input/output (I/O) devices, memory DIMMs, non-volatile random access memory (NVRAM), and hard disk drives. Each partition within an LPAR data processing system may be booted and shut down over and over without having to power-cycle the entire data processing system.

PCI-X and PCI Express are types of data processing system that are designed with a "flat" address space in mind. That is, if software can address an I/O device at some particular address, then other I/O devices can also access that same I/O device at the same address. The access from one I/O device to another is the basis of P2P operations.

While P2P bus topology provides a higher quality of service for some applications, P2P also has its drawbacks. For example, one I/O device may directly access another I/O device's memory without authorization. In a logically partitioned data processing system, this unauthorized or malicious access may translate to an I/O device of one partition harming an I/O device of another partition. This drawback affects the reliability of the system.

Currently, there is no existing mechanism that prevents such malicious or accidental P2P accesses, while allowing them when desired. An attempt has been made to prevent such attacks by using a bit in a bridge to turn off the P2P access entirely. However, this technique prevents P2P access between selected I/O devices when desired. For example, it may be desirable for an I/O device to receive P2P operations from one particular I/O device, but not from others. In addition, this technique limits P2P operations when more than one level of switch is used.

Therefore, it would be advantageous to have a method and an apparatus for restricting peer-to-peer operations in a data processing system, and particularly in a logically partitioned data processing system, that allows P2P operations when desired while preventing such operations when not desired. With such method and apparatus, P2P operations may be controlled such that reliability, availability, and serviceability of data processing systems are improved.

SUMMARY OF THE INVENTION

The present invention provides a method and apparatus for restricting input/output peer-to-peer operations. The present invention provides peer-to-peer control logic for detecting an input/output operation request on an input/output bus of the data processing system. Responsive to determining that a target of the input/output request is an input/output device, a lookup is performed by the control logic on a peer-to-peer lookup table comprising a plurality of entries. The control logic then determines if the requester identifier of the request matches a requester identifier of an entry in the plurality of entries.

If the requester identifier of the request matches the requester identifier of an entry in the plurality of entries, the control logic determines if an accept/reject bit of the entry is equal to one. If the accept/reject bit is equal to one, the control logic allows the input/output operation to be accepted by the target of the input/output operation request. If the accept/reject bit is not equal to one, the control logic rejects the input/output operation request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
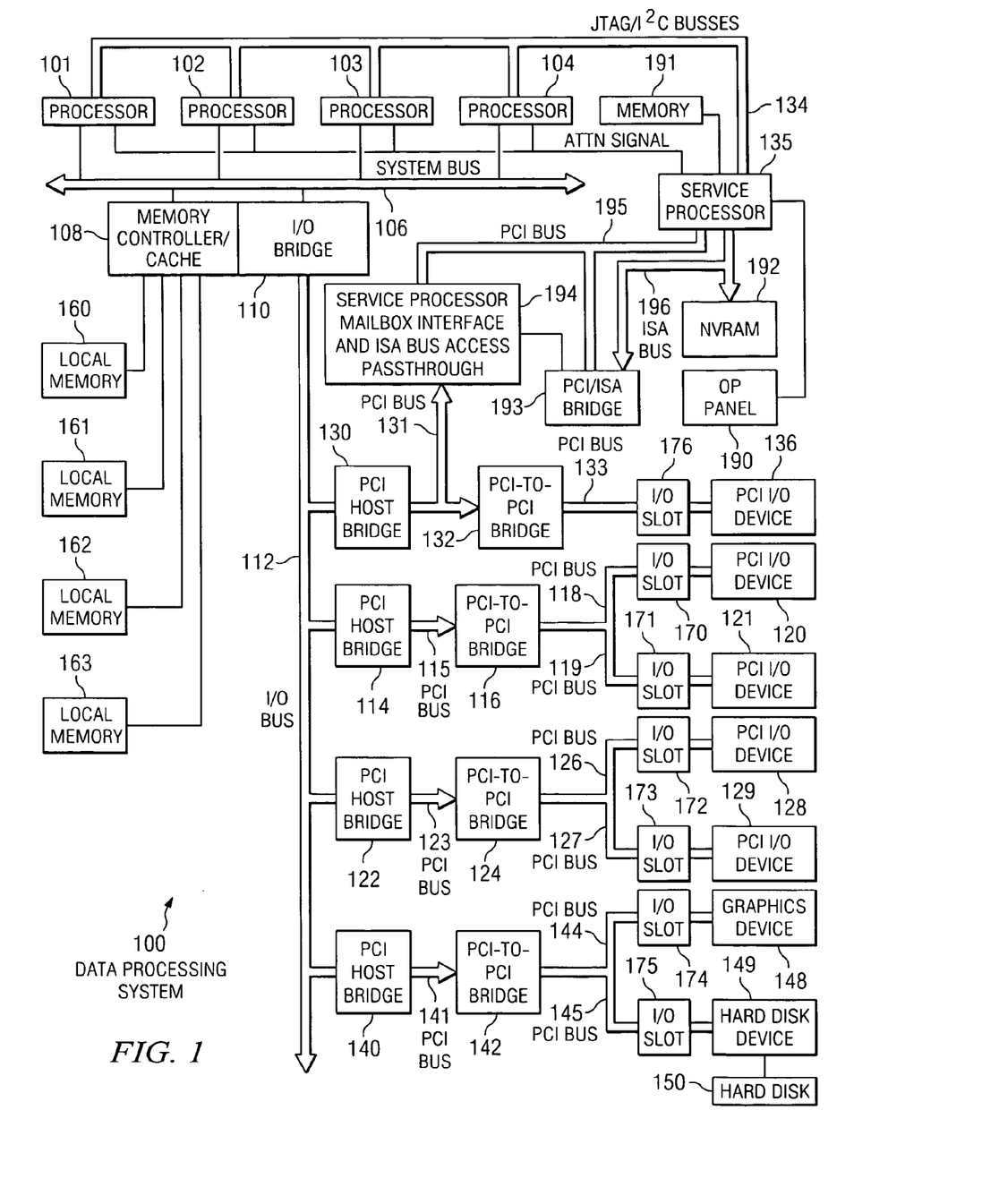
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logically partitioned (LPARed) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O devices 120-121, 128-129, and 136, graphics device 148, and hard disk device 149 may be assigned to different logical partitions. In this case, graphics device 148 provides a connection for a display device (not shown), while hard disk device 149 provides a connection to control hard disk 150.

Thus, for example, suppose data processing system 100 is divided into three logical partitions, P1, P2, and P3. Each of PCI I/O devices 120-121, 128-129, 136, graphics device 148, hard disk device 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O devices 120, 128, and 129 may be assigned to logical partition P1; processors 102-103, some portion of memory from local memories 160-163, and PCI I/O devices 121 and 136 may be assigned to partition P2; and processor 104, some portion of memory from local memories 160-163, graphics device 148 and hard disk device 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI I/O devices 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O devices 120 and 121 are placed into I/O slots 170 and 171, respectively. Typical PCI bus implementations will support between four and eight I/O devices (i.e. expansion slots for add-in connectors). Each PCI I/O device 120-121 provides an interface between data processing system 100 and I/O devices such as, for example, other network computers, which are clients to data processing system 100.

An additional PCI host bridge 122 provides an interface for an additional PCI bus 123. PCI bus 123 is connected to a plurality of PCI I/O devices 128-129. PCI I/O devices 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O devices 128 and 129 are placed into I/O slots 172 and 173, respectively. In this manner, additional I/O devices, such as, for example, modems or network I/O devices may be supported through each of PCI I/O devices 128-129. In this manner, data processing system 100 allows connections to multiple network computers.

A memory mapped graphics I/O device 148 inserted into I/O slot 174 may be connected to I/O bus 112 through PCI bus 144, PCI-to-PCI bridge 142, PCI bus 141 and PCI host bridge 140. Hard disk I/O device 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O device 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The present invention provides a method and an apparatus for restricting peer-to-peer (P2P) operations in a data processing system, and particularly a logically partitioned data processing system, to improve reliability, availability, and serviceability of the LPAR data processing system. In a preferred embodiment, the present invention enables a P2P I/O device to add a restricted P2P capability to its extended capabilities list. P2P I/O devices include bridge devices within the switch or other hardware devices, such as I/O devices. The restricted P2P capability may be implemented using a P2P control logic embedded within a secondary bridge of the switch or within an I/O device.

In one embodiment, the P2P control logic may include a P2P lookup table and logic that controls the P2P lookup table in the P2P device's memory address space. The P2P lookup table includes a number of entries. Within each entry, a bus number field, a device number field, a function number field and an accept/reject bit may be specified. All PCI-X and PCI Express transactions on the bus or link are tagged with a requester bus number, device number, and function number by the originator of the transaction. This combination is also called the Requester ID. Using the Requester IDs, the present invention may identify specific Requester IDs from which P2P operations are to be received.

The bus number field identifies an I/O operation bus number. Since each bus may include up to 32 I/O devices, the device number field identifies from which of the 32 I/O devices operations are received. For each I/O device, there may be up to 8 separate function subsets within the device. The function number field identifies from which of the 8 functions the operations are received. The device number and function fields are optional fields relative to the P2P lookup table.

The accept/reject bit in the P2P lookup table entry specifies whether the restricted P2P capability is enabled or disabled for the requesters specified by the Requester ID of that P2P lookup table entry. Thus, if the accept/reject bit of an entry is 1, the restricted P2P capability is enabled, meaning that the P2P device may receive P2P operations from the Requester ID specified in the entry. If the bit is 0, the restricted P2P capability is disabled, meaning that the P2P device may not receive P2P operations from the requesters specified by the Requester ID of that P2P lookup table entry.

In addition to the bus, device, and function number fields, each entry of the P2P lookup table may include an optional bus number control field, an optional device number control field, and an optional function number control field. The optional bus number control field allows a user to specify the number of bits of bus number to be compared. This allows for don't-cares and helps to reduce the P2P lookup table size. For example, by implementing the bus number control field in the P2P lookup table entry and setting it to ignore the lower order bit of the bus number in the Requester ID, two buses below a bridge can be specified by one P2P lookup table entry. An alternative embodiment would be to use a range of bus numbers in the P2P lookup table entry, identifying starting bus number and ending bus number.

The optional device number control field allows a user to specify whether or not the device number should be compared. The optional function number control field allows a user to specify whether or not the function number should be compared. These two fields also help to reduce the P2P lookup table size.

When an I/O operation is received from a secondary bus or link, the P2P control logic embedded within the switch or bridge determines if the target of the I/O operation is a primary bus or link. In PCI-X architectures, a bridge is typically used. In PCI Express architectures, a switch is typically used. A primary bus or link is one that connects between an upstream bridge/switch or a PCI host bridge and the switch or bridge. A secondary bus or link is one that connects between the switch or bridge and the individual P2P device.

If the target of the I/O operation is not a primary bus or link, meaning that the operation is downstream and thus, the operation is a P2P operation, the P2P control logic for the target secondary bus or link scans the P2P lookup table for a bus number, device number and a function number match. If a match is found, the P2P control logic determines if the accept/reject bit is equal to 1. If the accept/reject bit is equal to 1, the P2P control logic allows the I/O operation to be received from the Requester IDs specified in the entry.

If no match is found in the P2P lookup table or if the accept/reject bit is not equal to 1, the P2P control logic rejects the I/O operation to be received from the Requester IDs specified in the entry. In another embodiment, if no match is found in the P2P lookup table, the operation could be accepted instead of being rejected, or a separate no-match-found accept/reject bit could be implemented.

If the I/O operation is rejected, the P2P control logic determines if the I/O operation is a posted operation. A posted operation is defined as one where the I/O device has been given acknowledgement of a successful completion by an intermediary, even though the operation has not completed successfully at the final destination of the operation. If it is a posted operation, the posted data is discarded. However, if the I/O operation is not a posted operation, a Target Abort is sent back to the originator for PCI-X operations or an Unsupported Request is sent back for PCI Express operations. Generally, a Target Abort or Unsupported Request will result in the I/O device sending an interrupt to the I/O software device driver of the originating P2P device, so that the device driver can handle the error.

In one embodiment, the P2P control logic may include four configuration registers in the Extended Capability space and a P2P look up table within a portion of the P2P device's memory address space. The present invention uses the first register within the address space to indicate presence of the restricted P2P capability on an I/O device to the software that controls the I/O device, for example, device drivers. The second and third registers indicate the lower and upper address limits of a section of the device's memory address space. The limits describe the address range of the P2P lookup table. Similarly, the P2P lookup table includes a number of entries with each entry including a bus number, a device number and a function number identifying devices with which the P2P device may communicate.

The fourth register is a control register, which includes an enable bit that indicates whether the restricted P2P capability is currently employed. In addition, the fourth register may include a count of the number of entries programmed in the P2P lookup table. In this way, searching of the entries is limited to only a few entries that are programmed in the P2P lookup table. If the enable bit is set to 1 for the P2P device, the device may receive I/O operations from I/O devices that are listed in the P2P lookup table. If the enable bit is set to 0, the I/O device may receive I/O operations from any I/O device regardless of whether or not the I/O device is specified in the P2P lookup table. The enable bit is set to 0 as a default.

If a P2P device's enable bit is set to 1 and the I/O device is the target of a transaction, the Requester ID of the packet identifying the source of the transaction is extracted from the packet. From the second configuration register, the P2P device locates the base of its P2P lookup table, which points to the first entry in the P2P lookup table. The I/O device then compares the first entry in the P2P lookup table with the extracted Requester ID to determine if the Requester ID matches the bus number, device number, and function number of the entry. If a match is found, the P2P validation operation proceeds using this first P2P lookup table entry, and if the Accept/Reject bit is a 1, then the I/O device may receive operations from the source. If no match for the Requester ID is found in this first entry, then the P2P lookup pointer is incremented.

If the incremented value of the P2P lookup pointer exceeds the value from the third register, or if the number of P2P lookup table entries examined exceeds the optional count in the fourth register, then the end of the P2P lookup table has been reached, and no Requester ID has been found in the P2P lookup table. If the incremented value is less than the value from the third register, or if the number of P2P lookup table entries examined is less than the optional count in the fourth register, then the table entry referenced by the incremented value is checked to see if it matches the Requester ID. The value of the P2P lookup pointer (starting with the value in the second register) is incremented continuously until either a match is found with the Requester ID or the end of the P2P lookup table has been reached. If no Requester ID is found at the end of the P2P lookup table, a P2P error has occurred.

When a P2P error occurs, the source I/O device needs to be notified as soon as possible. With the present invention, if the source of the received packet requires a completion, such as a read request or a non-posted write request, the P2P device may return an unsuccessful completion status to the source I/O device. An unsuccessful completion status may be, for example, a Target Abort for PCI/PCI-X devices and Unsupported Request for PCI Express devices. Posted write requests may be dropped. In this illustrative embodiment, the prevention of peer-to-peer operations may prevent operations to conventional PCI, PCI-X or PCI Express devices from either PCI-X or PCI Express devices.

In addition to the bus, device, and function number fields, each P2P lookup table entry may include a bus validate, a device validate, and a function validate field indicating which of the bus number, device number, and the function number bits are used to validate the operation. This allows the definition of don't care fields and bits, which help keep the size of the P2P lookup table to a minimum. For example, a 3-bit bus validation field allows any number of bits of the low-order bits of the bus number to be declared as don't cares. In this way, a range of buses may be specified. Similarly, more than one bit may be used for the device validate and the function validate fields in order to specify a range of device numbers and function numbers within a given bus number in the P2P lookup table entry.

Thus, with the present invention, restricted P2P capability may be flagged by the firmware, such that only operations from authorized P2P devices may be received by the P2P device. With the P2P lookup table provided by the mechanism, operations from different buses may be separated using the table entries. With the control or validate fields, a range of buses may be specified, which helps to reduce the table size.

In addition, the present invention may extend the current PCI configuration header to include information to enable or disable restricted P2P capability, such that the firmware may automatically configure the capability of P2P operations. Alternatively, the restricted P2P capability may be set up by the platform firmware to either default to allow all P2P operations or disallow all P2P operations for the entire platform, and then a firmware call may be provided by the platform to allow the device drivers or operating system to enable the capability. The present invention may be implemented in a bridge or switch chip or in the target PCI I/O device itself.

Figure 2:
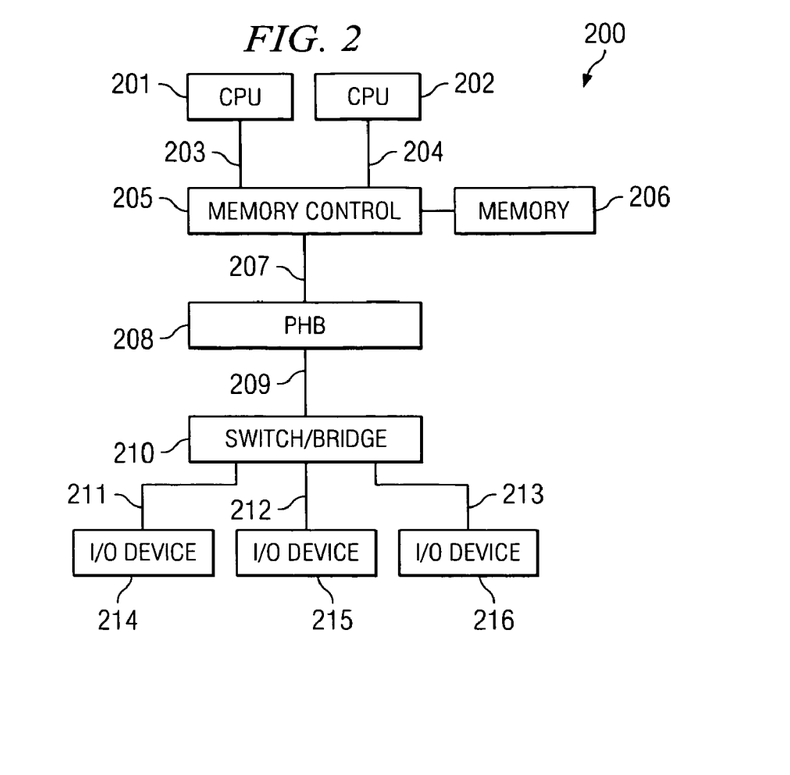
FIG. 2 is a diagram illustrating components in which the present invention may be implemented in accordance with a preferred embodiment of the present invention.

Turning now to FIG. 2, a diagram illustrating components in which the present invention may be implemented is depicted in accordance with a preferred embodiment of the present invention. In this illustrative embodiment, data processing system 200 includes a number of processors, such as CPU 201 and CPU 202. Each of the processors is connected with memory controller 205 via a processor bus, such as processor buses 203 and 204.

Memory controller 205 is also connected to a PCI host bridge 208, such as PCI host bridges 114, 122, 130 and 140 in FIG. 1, via an I/O mezzanine bus 207. Memory controller 205 is also connected to local memory 206, such as DIMMs. In addition, PCI host bridge 208 is connected to PCI/PCI-X bridge or PCI Express switch 210 via primary PCI bus 209. PCI/PCI-X bridge or PCI Express switch 210 is a switch or bridge that establishes a peer-to-peer link between two P2P devices, such as between I/O devices 214, 215, and 216, via secondary PCI buses 211, 212, and 213. PCI/PCI-X bridge or PCI Express switch 210 is described in further detail in FIG. 3 below.

If primary PCI bus 209 is a PCI-X bus, then block 210 is a PCI-X bridge. If primary PCI bus 209 is a PCI Express link, then block 210 is either a PCI Express to PCI-X bridge or a PCI Express switch. In a preferred embodiment, the mechanism of the present invention may be implemented using PCI-X bridge or PCI Express switch 210, and P2P devices, such as I/O devices 214, 215, and 216.

Figure 3:
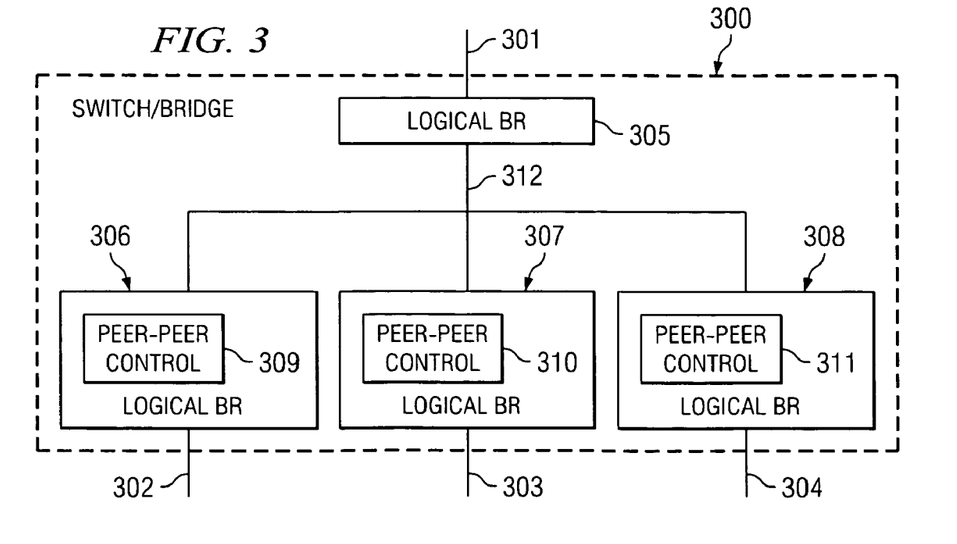
FIG. 3 is a diagram illustrating a PCI/PCI-X bridge or PCI Express bridge or switch in which the present invention may be implemented in accordance with a preferred embodiment of the present invention.

Turning now to FIG. 3, a diagram illustrating a PCI/PCI-X bridge or PCI Express switch in which the present invention may be implemented is depicted in accordance with a preferred embodiment of the present invention. FIG. 3 describes PCI/PCI-X bridge or PCI Express switch 210 in FIG. 2 in more detail. In this illustrative embodiment, PCI/PCI-X bridge or PCI Express switch 300 includes logical bridges 305, 306, 307, and 308.

Logical bridge 305 is a primary bridge that acts as an isolation point between primary PCI bus 301 and logical bridges 306, 307, and 308. Logical bridge 305 is connected to secondary logical bridges 306, 307, and 308 via internal interconnect bus 312. Each of logical bridges 306, 307, and 308 includes peer-to-peer control logic, such as P2P control logic 309, 310, and 311. P2P control logic 309, 310, and 311 are described in further detail in FIG. 4. P2P control logic 309, 310, and 311 limits I/O operations received by each P2P device via second PCI buses 302, 303, and 304 by scanning a P2P lookup table for the Requester ID of the source of the an operation.

In another embodiment, the P2P control logic 309, 310, and 311, could be implemented in the target I/O devices 214, 215, and 216 that are connected via second PCI buses 302, 303, and 304 instead of in logical bridges 306, 307, and 308.

Figure 4:
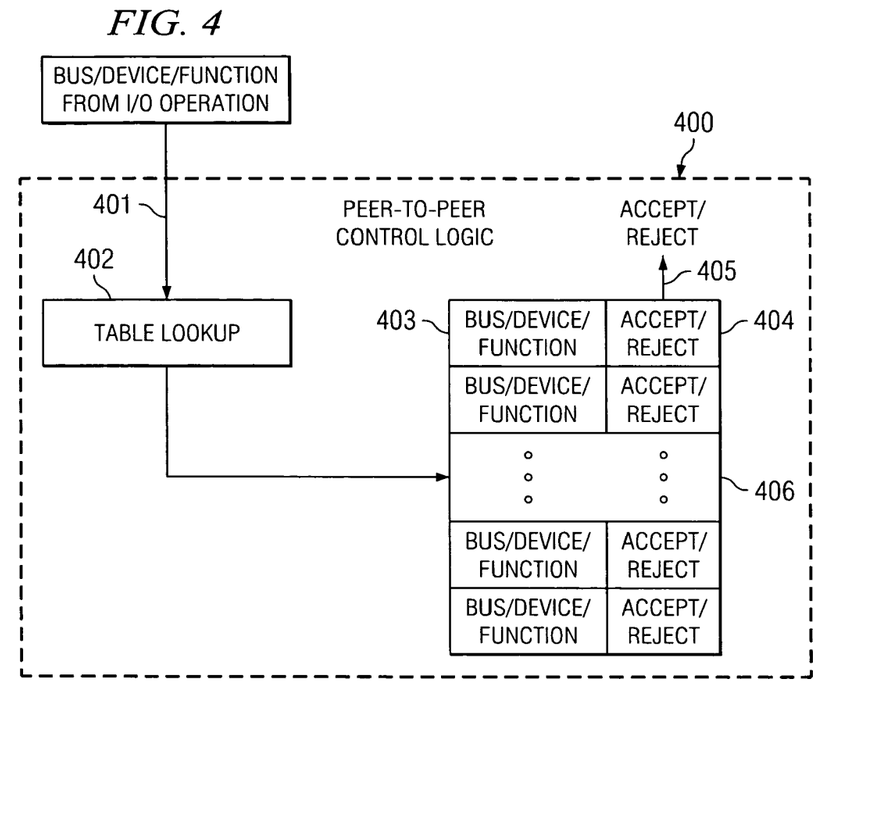
FIG. 4 is a diagram illustrating P2P control logic for restricting P2P operations in accordance with a preferred embodiment of the present invention.

Turning now to FIG. 4, a diagram illustrating the P2P control logic for restricting P2P operations is depicted in accordance with a preferred embodiment of the present invention. FIG. 4 describes P2P control logic 309, 310, and 311 in FIG. 3 in more detail. In this illustrative embodiment, peer-to-peer control logic 400 receives a bus, device, and function number (Requester ID) from originator of an I/O operation via the internal shared bus 312, which is originated on a secondary PCI bus 302, 303, or 304.

P2P control logic 400 includes a table lookup logic 402, which controls lookup of the received Requester ID in P2P lookup table 406. P2P lookup table 406 includes a number of entries. Entries of P2P lookup table are described in further detail in FIG. 5. In a preferred embodiment, each entry of P2P lookup table 406 may include a bus number, a device number, and a function number field 403. As mentioned above, each transaction sent by the originator of an I/O operation is tagged with a Requester ID.

Bus number, device number, and function number field 403 may consist of 16 bits, which includes an 8 bit bus number, a 5 bit device number, and a 3 bit function number. In addition, P2P lookup table 406 includes an accept/reject field 404, which includes a bit with a 1 indicating an accept and a 0 indicating a reject. The accept/reject field 404 controls an accept/reject control 405, which may perform other operations in case of an error, for example, handling a posted operation.

Figure 5:
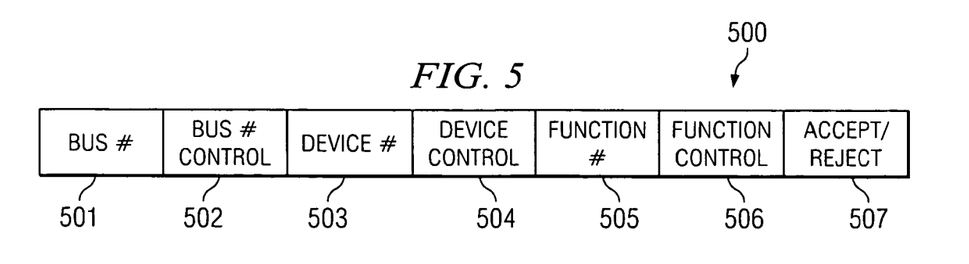
FIG. 5 is a diagram illustrating an exemplary entry of a P2P lookup table provided by the present invention in accordance with a preferred embodiment of the present invention.

Turning now to FIG. 5, a diagram illustrating an exemplary entry of a P2P lookup table provided by the present invention is depicted in accordance with a preferred embodiment of the present invention. FIG. 5 describes entries of P2P lookup table 406 in FIG. 4 in more detail. In this illustrative embodiment, P2P lookup table entry 500 includes bus number field 501, which identifies a bus number to be matched with the I/O operation bus number received from the originator. A user may also specify that bus number field 501 be ignored, which allows the P2P device to receive P2P I/O operations from all I/O devices.

Next, P2P lookup table entry 500 may also include an optional bus number control field 502, which identifies the number of bits of the bus number to compare. This allows for don't cares, which are devices that are ignored, and helps to reduce the P2P lookup table size. By specifying the number of bits to compare, a range of bus numbers may be ignored.

In addition, P2P lookup table entry 500 may include optional device number field 503, which identifies a device number within a bus from which I/O operations are received, since each bus may include up to 32 I/O devices. Then, P2P lookup table entry 500 may include optional device number control field 504, which identifies whether or not the device number in device number field 503 should be compared. This allows for reduction of the P2P lookup table size.

Furthermore, P2P lookup table entry 500 may include optional function number field 505, which identifies a function number within an I/O device, since each device may include up to 8 functions. P2P Lookup table entry 500 may also include optional function number control field 506, which identifies whether or not the function number in function number field 505 should be compared. This also allows for reduction of P2P lookup table size. Fields 501, 502, 503, 504, 505, and 506 thus determine the range of Requester IDs to which the P2P lookup table entry 500 applies.

Finally, P2P lookup table entry 500 includes an accept/reject bit 507, which identifies whether P2P capability is enabled or disabled for the range of Requester IDs specified in the P2P lookup table entry 500. If bit 507 is set to 1, the P2P device may accept I/O operations sent from the Requester IDs specified in P2P lookup table entry 500. If bit 507 is set to 0, the P2P device must reject I/O operations sent from the Requester IDs specified in P2P lookup table entry 500.

Figure 6:
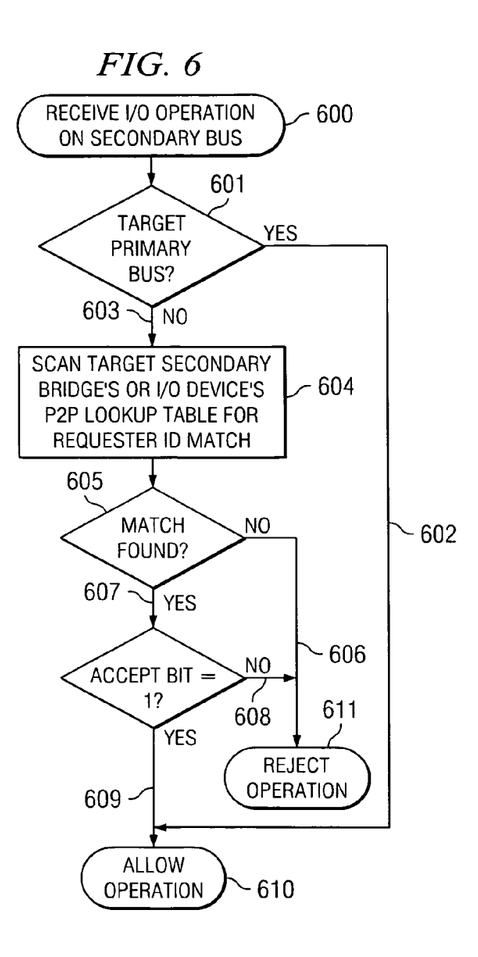
FIG. 6 is a flowchart of an exemplary process for restricting P2P operations in a data processing system in accordance with a preferred embodiment of the present invention.

Turning now to FIG. 6, a flowchart of an exemplary process for restricting P2P operations in a data processing system is depicted in accordance with a preferred embodiment of the present invention. The exemplary process begins when a bridge or switch receives an I/O operation on the secondary bus (step 600).

Next, a determination is made by the P2P control logic as to whether the target of the I/O operation is a primary bus (step 601). If the target is a primary bus, meaning that the I/O operation is for upstream, the P2P control logic allows the operation to be received by the target (step 610). However, if the target is not a primary bus, the P2P control logic scans the secondary bridge P2P lookup table of the target for a Requester ID match (step 604).

The P2P control logic scans the P2P lookup table entries and matches the Requester IDs in the P2P lookup table entries against the I/O Requester IDs to determine if the I/O operation can be received by the P2P device. A determination is then made by the P2P control logic as to whether a match is found (step 605).

If a match is found in step 605, a determination is made by the P2P control logic as to whether an accept/reject bit is equal to 1 (step 607). If no match is found in step 605, the process continues to step 611. In an alternative embodiment, if no match is found in step 605, the process could continue to step 610, and the operation could be allowed.

Turning back to step 607, if the accept/reject bit is equal to 1, the P2P control logic allows the operation to be received by the target. Otherwise, the accept/reject bit is not equal to 1, the process continues to step 611. At step 611, the P2P control logic rejects the I/O operation to be received by the target and the process terminates thereafter. Step 611 is described in further detail in FIG. 7 below.

Figure 7:
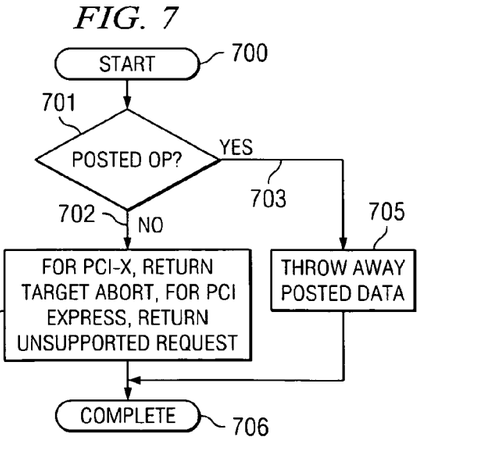
FIG. 7 is a flowchart of an exemplary process for rejecting I/O operations in accordance with a preferred embodiment of the present invention.

Turning now to FIG. 7, a flowchart of an exemplary process for rejecting an I/O operation is depicted in accordance with a preferred embodiment of the present invention. This exemplary process describes step 611 in FIG. 6 in further detail.

The process begins when the P2P control logic rejects an I/O operation (step 700). Next, a determination is made by the P2P control logic as to whether the I/O operation is a posted operation (step 701). If the I/O operation is a posted operation, the P2P control logic throws away the posted data (step 705), since an illegal P2P operation has occurred. The process terminates thereafter.

However, if the I/O operation is not a posted operation, the P2P control logic performs a Target Abort operation for PCI-X operations or an Unsupported Request for PCI Express operations (step 704). The process terminates thereafter.

It is important to note that the present invention is particularly useful in LPARed systems, where isolation of partitions is used to increase reliability, and that the present invention increases the reliability even more by restricting P2P I/O device operations. However, the present invention is also useful in data processing systems without LPAR, where accidental P2P operations may occur. By restricting P2P I/O device operations in such data processing systems using the present invention, undesirable P2P operations can be prevented and reliability of such data processing systems is greatly increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system to restrict input/output peer-to-peer operations between a plurality of peer-to-peer devices that are each operably coupled together by one of a switch and bridge (switch/bridge), wherein the switch/bridge has a primary input/output bus operably coupled to an upstream switch/bridge and a plurality of downstream secondary input/output buses each operably coupled to a given peer device of the plurality of peer-to-peer devices, the method comprising:

detecting an input/output operation request on a given secondary input/output bus of the plurality of downstream secondary input/output buses;

responsive to determining that a target of the input/output operation request is a peer device coupled to another downstream secondary input/output bus of the plurality of downstream secondary input/output buses, performing a lookup on a peer-to-peer lookup table comprising a plurality of entries for at least some of the plurality of peer-to-peer devices which are each operably coupled to a respective one of the plurality of downstream secondary input/output buses;

determining whether a requester identifier of the input/output operation request matches a corresponding requester identifier of any entry in the plurality of entries;

when the requester identifier of the input/output operation request does not match at least one corresponding requester identifier in the plurality of entries, rejecting the input/output operation request targeted for the peer device;

when the requester identifier of the input/output operation request matches the requester identifier of an entry in the plurality of entries, determining if an accept/reject bit of the entry is equal to one; and when the accept/reject bit is not equal to one, rejecting the input/output operation request targeted for the peer device.

2. The method of claim 1, further comprising:

if the accept/reject bit is equal to one, allowing the input/output operation to be accepted by the target of the input/output operation request, wherein the steps of rejecting the input/output operation and allowing the input/output operation are performed by control logic embedded in the switch/bridge and is associated with the another secondary input/output bus.

3. A method in a data processing system to restrict input/output peer-to-peer operations between a plurality of peer-to-peer devices that are each operably coupled together by one of a switch and bridge (switch/bridge), wherein the switch/bridge has a primary input/output bus operably coupled to an upstream switch/bridge and a plurality of downstream secondary input/output buses each operably coupled to a given peer device of the plurality of peer-to-peer devices, the method comprising:

detecting an input/output operation request on a given secondary input/output bus of the plurality of downstream secondary input/output buses;

responsive to determining that a target of the input/output operation request is a peer device coupled to another downstream secondary input/output bus of the plurality of downstream secondary input/output buses, performing a lookup on a peer-to-peer lookup table comprising a plurality of entries for at least some of the plurality of peer-to-peer devices which are each operably coupled to a respective one of the plurality of downstream secondary input/output buses;

determining whether a requester identifier of the input/output operation request matches a corresponding requester identifier of any entry in the plurality of entries; and when the requester identifier of the input/output operation request does not match at least one corresponding requester identifier in the plurality of entries, rejecting the input/output operation request, wherein the requester identifier of the entry includes a bus number, a device number, and a function number, wherein the bus number identifies the input/output bus, wherein the input/output bus comprises a plurality of devices, and wherein each device in the plurality of devices comprises a plurality of functions.

4. The method of claim 3, wherein each entry further of the plurality of entries comprises:
a bus number control field for the bus number, a device control field for the device number, and a function control field for the function number.

5. The method of claim 4, wherein the bus number control field indicates a number of bits of the bus number to be compared, and wherein a range of bus numbers is specified using the bus number control field.

6. A method in a data processing system to restrict input/output peer-to-peer operations between a plurality of peer-to-peer devices that are each operably coupled together by one of a switch and bridge (switch/bridge), wherein the switch/bridge has a primary input/output bus operably coupled to an upstream switch/bridge and a plurality of downstream secondary input/output buses each operably coupled to a given peer device of the plurality of peer-to-peer devices, the method comprising:
detecting an input/output operation request on a given secondary input/output bus of the plurality of downstream secondary input/output buses;
responsive to determining that a target of the input/output operation request is a peer device coupled to another downstream secondary input/output bus of the plurality of downstream secondary input/output buses, performing a lookup on a peer-to-peer lookup table comprising a plurality of entries for at least some of the plurality of peer-to-peer devices which are each operably coupled to a respective one of the plurality of downstream secondary input/output buses;
determining whether a requester identifier of the input/output operation request matches a corresponding requester identifier of any entry in the plurality of entries; and
when the requester identifier of the input/output operation request does not match at least one corresponding requester identifier in the plurality of entries, rejecting the input/output operation request, wherein rejecting comprises:
determining if the input/output operation request includes a posted operation;
when the input/output operation request includes a posted operation, discarding posted data; and
when no posted operation is included in the input/output operation request, sending a target abort signal back to a requester of the input/output operation.

7. A method in a data processing system to restrict input/output peer-to-peer operations between a plurality of peer-to-peer devices that are each operably coupled together by one of a switch and bridge (switch/bridge), wherein the switch/bridge has a primary input/output bus operably coupled to an upstream switch/bridge and a plurality of downstream secondary input/output buses each operably coupled to a given peer device of the plurality of peer-to-peer devices, the method comprising:
detecting an input/output operation request on a given secondary input/output bus of the plurality of downstream secondary input/output buses;
responsive to determining that a target of the input/output operation request is a peer device coupled to another downstream secondary input/output bus of the plurality of downstream secondary input/output buses, performing a lookup on a peer-to-peer lookup table comprising a plurality of entries for at least some of the plurality of peer-to-peer devices which are each operably coupled to a respective one of the plurality of downstream secondary input/output buses;
determining whether a requester identifier of the input/output operation request matches a corresponding requester identifier of any entry in the plurality of entries; and
when the requester identifier of the input/output operation request does not match at least one corresponding requester identifier in the plurality of entries, rejecting the input/output operation request, wherein rejecting comprises: determining if the input/output operation request includes a posted operation; if the input/output operation request includes a posted operation, discarding posted data; and if no posted operation is included in the input/output operation request, sending a target abort signal back to a requester of the input/output operation, wherein the rejection further comprises:
returning a target abort to an input/output device requesting the input/output operation if the input/output operation request is a PCI-X operation; and
returning an unsupported request to an input/output device requesting the input/output operation if the input/output operation request is a PCI Express operation.

8. A method in a data processing system to restrict input/output peer-to-peer operations between a plurality of peer-to-peer devices that are each operably coupled together by one of a switch and bridge (switch/bridge), wherein the switch/bridge has a primary input/output bus operably coupled to an upstream switch/bridge and a plurality of downstream secondary input/output buses each operably coupled to a given peer device of the plurality of peer-to-peer devices, the method comprising:
detecting an input/output operation request on a given secondary input/output bus of the plurality of downstream secondary input/output buses;
responsive to determining that a target of the input/output operation request is a peer device coupled to another downstream secondary input/output bus of the plurality of downstream secondary input/output buses, performing a lookup on a peer-to-peer lookup table comprising a plurality of entries for at least some of the plurality of peer-to-peer devices which are each operably coupled to a respective one of the plurality of downstream secondary input/output buses;
determining whether a requester identifier of the input/output operation request matches a corresponding requester identifier of any entry in the plurality of entries; and
when the requester identifier of the input/output operation request does not match at least one corresponding requester identifier in the plurality of entries, rejecting the input/output operation request;
when the requester identifier of the input/output operation request matches the requester identifier of an entry in the plurality of entries, determining if an accept/reject bit of the entry is equal to one;
when the accept/reject bit is not equal to one, rejecting the input/output operation request;
when the accept/reject bit is equal to one, allowing the input/output operation to be accepted by the target of the input/output operation request, wherein detecting, performing, determining, allowing, and rejecting are performed by a peer-to-peer control logic implemented in one of a switch/bridge and an input/output device of the data processing system.

9. The method of claim 8, wherein the switch/bridge is one of a PCI-X bridge, a PCI Express bridge, and a PCI Express switch.

10. A data processing system to restrict input/output peer-to-peer operations between a plurality of peer-to-peer input/output devices that are each operably coupled together, the data processing system comprising:
  a plurality of processors connected to a memory controller via a processor bus; and
  an input/output host bridge connected to the memory controller via an I/O mezzanine bus and one of an input/output bridge and an input/output switch connected to the memory controller via a primary input/output bus, wherein the one of the input/output bridge and the input/output switch establish a link in a peer-to-peer network between the plurality of peer-to-peer input/output devices via a secondary input/output bus;
  peer-to-peer control logic stored in one of: the one of the input/output bridge and the input/output switch, and (ii) each of the plurality of peer-to-peer input/output devices, wherein the peer-to-peer control logic comprises:
  a peer-to-peer lookup table for a peer-to-peer input/output device, the peer-to-peer lookup table comprising a plurality of entries for at least some of the plurality of peer-to-peer input/output devices which are each connected to the secondary input/output bus;
  instructions for performing a lookup on the peer-to-peer lookup table responsive to both detecting an input/output operation request on the secondary input/output bus and determining that a target of the input/output operation request is a peer-to-peer input/output device connected to the secondary input/output bus;
  instructions for determining whether a requester identifier of the input/output operation request matches a corresponding requester identifier of any entry in the plurality of entries; and
  instructions for rejecting the input/output operation request when the requester identifier of the request does not match at least one corresponding requester identifier in the plurality of entries.

11. The data processing system of claim 10, wherein each entry in the plurality of entries comprises:

a requester identifier comprising a bus number, a device number, and a function number, wherein the bus number identifies an input/output operation bus, wherein the input/output operation bus comprises a plurality of devices, and wherein each device in the plurality of devices comprises a plurality of functions;
  a bus number control field for the bus number, a device control field for the device number, and a function control field for the function number, wherein the control field for the bus number indicates a number of bits of the bus number to be compared, and wherein a range of bus numbers is specified using the control field for the bus number.

12. The data processing system of claim 10, wherein the peer-to-peer control logic further comprises:
  instructions for determining, when an accept/reject bit of the entry is equal to one, whether the requester identifier of the request matches the at least one corresponding requester identifier;
  instructions for allowing the input/output operation to be accepted by the target, when the accept/reject bit is equal to one; and
  instructions for rejecting the input/output operation request, when the accept/reject bit is not equal to one.

13. The data processing system of claim 12, wherein the peer-to-peer control logic further comprises:
  instructions for determining whether the input/output operation request includes a posted operation;
  instructions for discarding posted data when the input/output operation request includes a posted operation; and
  instructions for sending a target abort signal back to a requestor of the input/output operation when no posted operation is included in the input/output operation request.

14. The data processing system of claim 13, wherein the peer-to-peer control logic further comprises:
  instructions for returning a target abort to an input/output device requesting the input/output operation if the request is a PCI-X operation;
  instructions for returning an unsupported request to an input/output device requesting the input/output operation if the request is a PCI Express operation, wherein the input/output bridge is one of a PCI-X bridge and a PCI Express bridge, and wherein the input/output switch is a PCI Express switch.

* * * * *